(12) United States Patent
Maguire et al.

(10) Patent No.: US 11,124,055 B2
(45) Date of Patent: Sep. 21, 2021

(54) AXLE ASSEMBLY FOR USE IN A VEHICLE

(71) Applicant: BorgWarner Inc., Auburn Hills, MI (US)

(72) Inventors: Joel Maguire, Hartland, MI (US); John Barlage, Rochester Hills, MI (US); John Ashley Peterson, Troy, MI (US)

(73) Assignee: Borg Warner Inc., Auburn Hills, MI (US)

( * ) Notice: Subject to any disclaimer, the term of this patent is extended or adjusted under 35 U.S.C. 154(b) by 63 days.

(21) Appl. No.: 16/814,614

(22) Filed: Mar. 10, 2020

(65) Prior Publication Data

US 2020/0290444 A1    Sep. 17, 2020

Related U.S. Application Data

(60) Provisional application No. 62/817,010, filed on Mar. 12, 2019.

(51) Int. Cl.
| | | |
|---|---|---|
| *B60K 1/02* | (2006.01) | |
| *B60K 7/00* | (2006.01) | |
| *B62D 5/04* | (2006.01) | |
| *B60K 17/24* | (2006.01) | |

(52) U.S. Cl.
CPC .............. *B60K 1/02* (2013.01); *B60K 7/0007* (2013.01); *B62D 5/0421* (2013.01); *B60K 17/24* (2013.01); *B60K 2007/0092* (2013.01)

(58) Field of Classification Search
CPC .................... B60K 1/02; B60K 7/0007; B60K 2007/0092; B62D 5/0421
See application file for complete search history.

(56) References Cited

U.S. PATENT DOCUMENTS

| | | | | |
|---|---|---|---|---|
| 1,264,748 | A * | 4/1918 | Apple ..................... | B60K 5/00 180/62 |
| 1,338,042 | A * | 4/1920 | Ross et al. .............. | B60L 50/50 180/62 |
| 2,027,218 | A * | 1/1936 | Armington ............... | B61C 9/38 74/664 |
| 3,693,745 | A * | 9/1972 | Petrov ..................... | B60K 1/00 180/60 |

(Continued)

OTHER PUBLICATIONS

Athena, "Athena Technology Automotive Webpage", 2018, https://www.athenatechno.tech/automobile, 8 pages.

(Continued)

*Primary Examiner* — Erez Gurari
(74) *Attorney, Agent, or Firm* — Howard & Howard Attorneys PLLC

(57) ABSTRACT

An axle assembly for use in a vehicle includes an axle housing extending along an axle axis. The vehicle includes a first wheel and a second wheel spaced from the first wheel, and a chassis extending along a chassis axis. The axle housing is configured to pivot with respect to the chassis about a pivot axis. The pivot axis is configured to be obliquely oriented with respect to the chassis axis such that the axle housing is configured to be a tilted axle housing. The axle assembly also includes an electric motor coupled to the axle housing and configured to be rotatably coupled to at least one of the first and second wheels. The electric motor is disposed in the axle cavity such that the electric motor is surrounded by the axle housing.

20 Claims, 3 Drawing Sheets

(56) References Cited

U.S. PATENT DOCUMENTS

| | | | | |
|---|---|---|---|---|
| 6,039,143 A * | 3/2000 | Kielar | B62D 5/0421 |
| | | | 180/253 |
| 6,092,468 A | 7/2000 | Hase | |
| 9,045,029 B2 | 6/2015 | Mair et al. | |
| 10,029,565 B1 * | 7/2018 | Keller | B60K 17/358 |
| 10,457,330 B2 * | 10/2019 | Perlo | B62D 33/044 |
| 2010/0181135 A1 * | 7/2010 | Sbarro | B62D 7/14 |
| | | | 180/253 |
| 2011/0094807 A1 * | 4/2011 | Pruitt | B60K 17/36 |
| | | | 180/65.6 |
| 2012/0026467 A1 * | 2/2012 | Chapman | F16M 11/18 |
| | | | 352/243 |
| 2012/0152630 A1 * | 6/2012 | Chapman | B66F 11/048 |
| | | | 180/24.07 |
| 2013/0153324 A1 * | 6/2013 | Kissel, Jr. | B60F 1/043 |
| | | | 180/253 |
| 2014/0008172 A1 | 1/2014 | Lundstrom | |
| 2014/0139009 A1 * | 5/2014 | Bindl | B60K 7/0007 |
| | | | 301/6.5 |
| 2018/0172083 A1 | 6/2018 | Severinsson et al. | |
| 2018/0296906 A1 * | 10/2018 | Quick | B60B 35/14 |
| 2020/0290444 A1 * | 9/2020 | Maguire | B60K 1/02 |
| 2021/0039492 A1 * | 2/2021 | Wang | B60K 17/12 |
| 2021/0047016 A1 * | 2/2021 | Rygg | B08B 9/023 |
| 2021/0170259 A1 * | 6/2021 | Quick | B60K 7/0007 |

OTHER PUBLICATIONS

Vehicle Dynamics International, "Interesting Work is Underway at Athena to Study the Dynamic Behavior of Pivoting Axle Platforms", https://secure.viewer.zmags.com/publication/569eb3ad#/569eb3ad/1, 2019, p. 60.

* cited by examiner

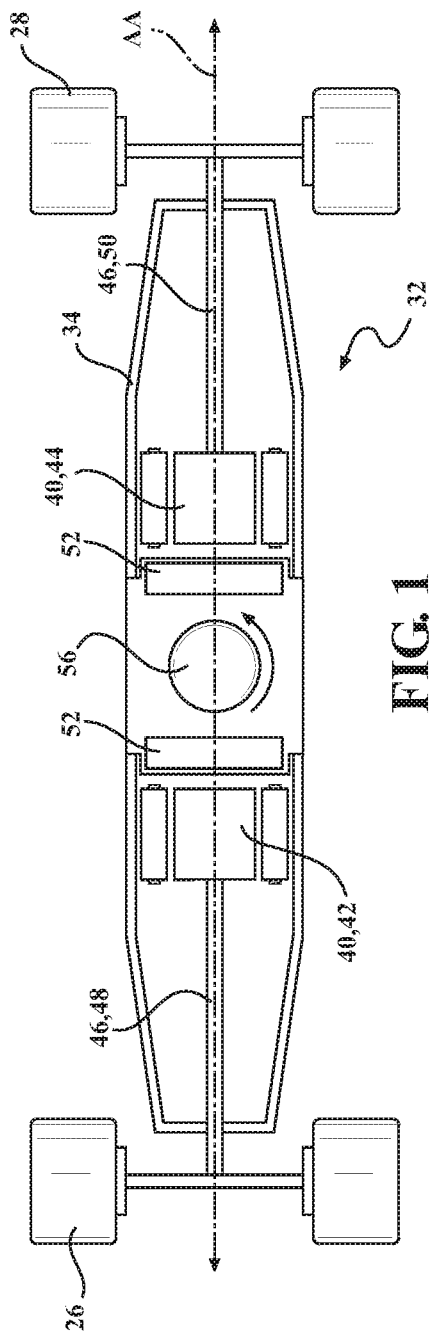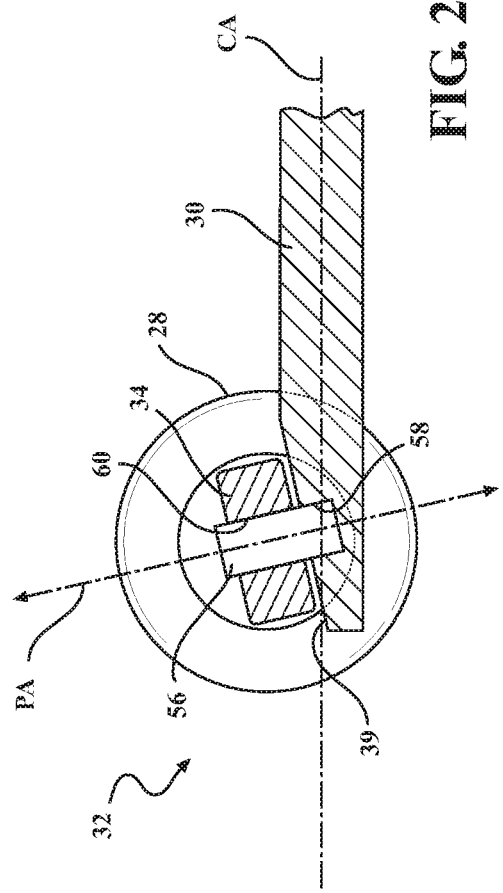

AXLE ASSEMBLY FOR USE IN A VEHICLE

CROSS-REFERENCE TO RELATED APPLICATIONS

The subject patent application claims priority to and all the benefits of U.S. Provisional Patent Application No. 62/817,010 filed on Mar. 12, 2019, the disclosure of which is herein incorporated by reference in its entirety.

BACKGROUND OF THE INVENTION

1. Field of the Invention

The present invention generally relates to an axle assembly for use in a vehicle.

2. Description of the Related Art

Conventional vehicles in the art include a first wheel and a second wheel spaced from the first wheel, and a chassis for supporting the first and second wheels. Conventional vehicles in the art also include an axle housing coupled to the chassis, extending between the first and second wheels, and rotatably coupled to the first and second wheels for supporting the first and second wheels.

In recent years, there has been an increased desire for electric vehicles. Such electric vehicles include fully electric vehicles, where the electric vehicle is powered solely from electric power, and hybrid vehicles, where the electric vehicle is powered by both electric power and an internal combustion engine. In such electric vehicles, an electric motor is included to help deliver rotational power to at least one of the wheels of the vehicle.

In typical electric vehicles, the electric motor is coupled to the axle housing for providing rotational power to at least one of the wheels of the vehicle. Some conventional electric vehicle designs use "in wheel motors," where a first electric motor is rotatably coupled to the first wheel and disposed in the first wheel, and where a second electric motor is rotatably coupled to the second wheel and disposed in the second wheel. Although such in-wheel motors allow precise controlling of the rotational power delivered to the first and second wheels, many disadvantages arise from using in-wheel motors. First, in-wheel motors are exposed to an external environment, which results in the electric motors being exposed to debris from the external environment. Second, electric motors often require cooling systems. To this end, when the in-wheel motors require cooling systems, complex and expensive designs are needed to cool the electric motors as a result of the location of the electric motors in the wheel. Third, inertia impact as a result of vertical movement of the wheels can result in quick and extreme movement on the electric motors, as the electric motors quickly move vertically in unison with the wheels. Fourth, various electrical equipment, such as high-voltage cables, are either exposed or require additional and complex electrical equipment to electrically couple the in-wheel motor to various control units of the vehicle.

As such, there remains a need to provide an improved axle assembly that accounts for the above disadvantages.

SUMMARY OF THE INVENTION AND ADVANTAGES

An axle assembly for use in a vehicle includes an axle housing extending along an axle axis. The vehicle includes a first wheel and a second wheel spaced from the first wheel, and a chassis extending along a chassis axis. The axle housing is configured to be coupled to the chassis, to extend between the first and second wheels, and to support the first and second wheels. The axle housing defines an axle cavity such that the axle housing has a hollow configuration. The axle housing is configured to pivot with respect to the chassis about a pivot axis perpendicular to the axle axis. The pivot axis is configured to be obliquely oriented with respect to the chassis axis such that the axle housing is configured to be a tilted axle housing. The axle assembly also includes an electric motor coupled to the axle housing and configured to be rotatably coupled to at least one of the first and second wheels. The electric motor is disposed in the axle cavity such that the electric motor is surrounded by the axle housing.

Accordingly, the axle housing including the electric motor disposed in the axle cavity such that the electric motor is surrounded by the axle housing shields the electric motor from an external environment, which results in limiting if not eliminating the electric motor from being exposed to debris. Second, any cooling system for the electric motor is able to be less complex and cheaper, as the cooling system can be integrated into the axle housing and not be disposed in the wheels of the vehicle. Third, inertia impact is reduced, as vertical movement of the electric motor is reduced with respect to the first and second wheels of the vehicle. Fourth, various electrical equipment, such as high-voltage cables, are shielded from the external environment and do not require complex electrical equipment to electrically couple the electric motor to various control units of the vehicle.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 1 is schematic cross-sectional view of an axle assembly of a pivoting assembly of a vehicle, with the axle assembly including an axle housing, and with the vehicle including a first and second wheels;

FIG. 2 is a schematic side view of the pivoting assembly including a chassis and a pivot axle;

DETAILED DESCRIPTION OF THE INVENTION

Figure 3:
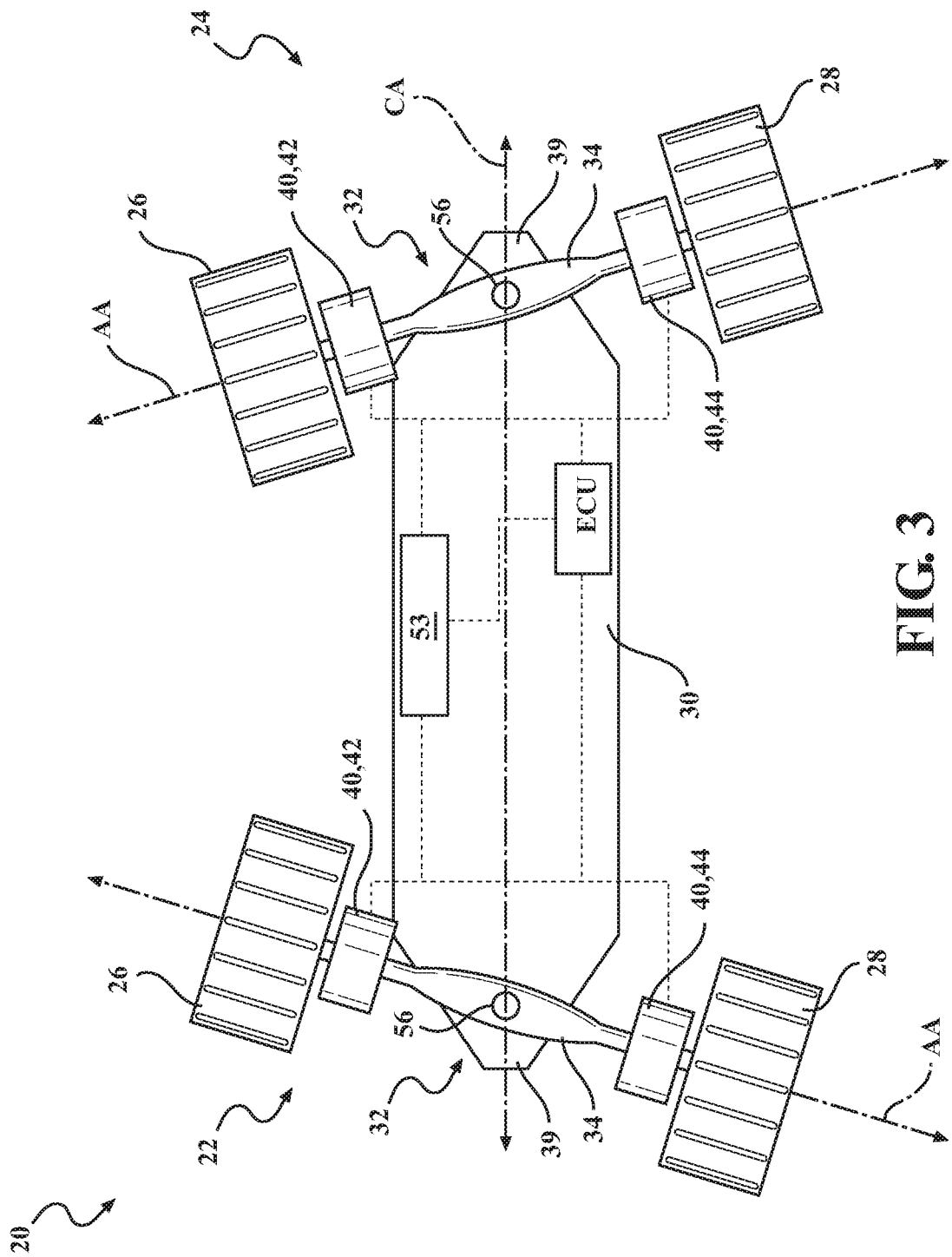
FIG. 3 is a schematic representation of the axle assembly of the pivoting assembly of the vehicle including a first and second electric motor disposed inboard from the first and second wheels.

With reference to the Figures, wherein like numerals indicate like parts throughout the several views, a vehicle 20 is schematically shown in FIG. 3. The vehicle 20 has a front end 22 and a back end 24. The vehicle 20 includes a first wheel 26 and a second wheel 28 spaced from the first wheel 26. It is to be appreciated that in the context of this disclosure that the first and second wheels 26, 28 may be at the front end 22 of the vehicle 20, or may be at the back end 24 of the vehicle 20. Additionally, the vehicle 20 may be a three-wheel vehicle. In such embodiments, the first and second wheels 26, 28 may be at the front end 22 of the vehicle 20, and a single wheel may be at the back end 24 of the vehicle 20. Alternatively, the first and second wheels 26, 28 may be at the back end 24 of the vehicle 20, and the single wheel may be at the front end 22 of the vehicle 20. Typically, the vehicle 20 is a low-speed electric vehicle, neighborhood electric vehicle, short commute vehicle, and the like. The vehicle 20 may be an autonomous vehicle. However, it is to be appreciated that the vehicle 20 may be a conventional passenger vehicle.

The vehicle 20 also includes a chassis 30 extending along a chassis axis CA for supporting the vehicle 20. As shown in FIG. 1, the vehicle 20 includes an axle assembly 32 including an axle housing 34 extending along an axle axis AA. Typically, the axle housing 34 is a non-articulating axle, commonly referred to as a beam axle. The axle assembly 32 and the chassis 30 collectively form a pivoting assembly 36. The axle housing 34 is configured to be coupled to the chassis 30, to extend between the first and second wheels 26, 28, and to support the first and second wheels 26, 28. The axle housing 34 defines an axle cavity 38 such that the axle housing 34 has a hollow configuration. The axle housing 34 is configured to pivot with respect to the chassis 30 about a pivot axis PA perpendicular to the axle axis AA. The pivot axis PA is configured to be obliquely oriented with respect to the chassis axis CA such that the axle housing 34 is configured to be a tilted axle housing. Having the axle housing 34 configured as a tilted axle housing allows the vehicle 20 to complete sharper turns than conventional axle housings (i.e., not tilted). With reference to FIG. 2, the chassis 30 may have an angled surface 39 obliquely oriented with respect to the chassis axis CA. When present, the angled surface 39 supports the axle housing 34. The angled surface 39 and the pivot axis PA define an angle therebetween that is sufficient for a desired turn radius of the vehicle 20. The pivot axis PA may be perpendicularly oriented with respect to the angled surface 39.

Figure 4:
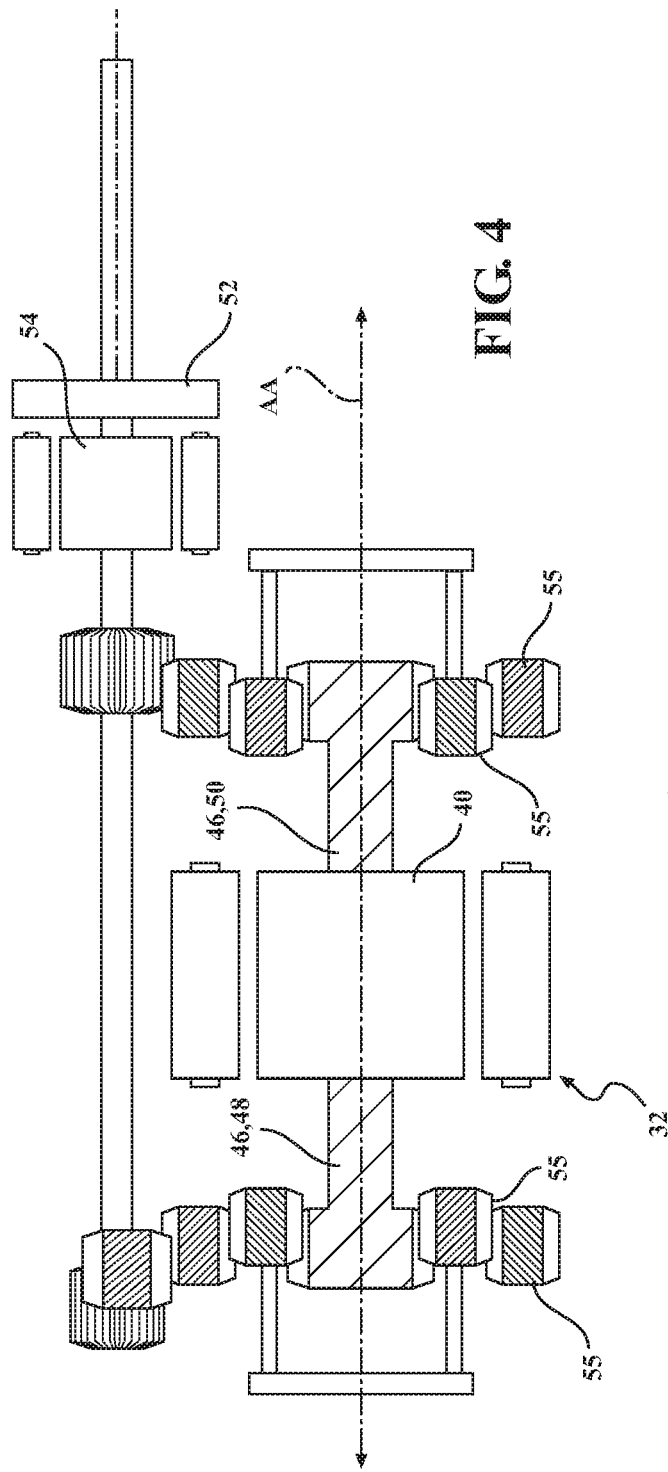
FIG. 4 is a schematic representation of another embodiment of the axle assembly including the electric motor and a steering motor.

With reference to FIGS. 1 and 4, the axle assembly 32 also includes an electric motor 40 coupled to the axle housing 34. The electric motor 40 is configured to be rotatably coupled to at least one of the first and second wheels 26, 28. Having the electric motor 40 rotatably coupled to at least one of the first and second wheels 26, 28 allows the electric motor 40 to deliver rotational power to at least one of the first and second wheels 26, 28. It is to be appreciated that in addition to delivering rotational power to at least one of the first and second wheels 26, 28, the electric motor 40 may also be configured as a generator to provide electric power regeneration and, in turn, electric braking. It is also to be appreciated that the vehicle 20 may include more than one axle assembly 32, i.e., two axle assemblies 32. In such embodiments, as shown in FIG. 3, the vehicle 20 may include the axle assembly 32 at the back end 24 of the vehicle 20, and may include another one of the axle assembly 32 at the front end 22 of the vehicle 20. To this end, it is to be appreciated that any description of the axle assembly 32 in this disclosure may also apply to the vehicle 20 including two of the axle assemblies 32 (i.e., one axle assembly 32 for the front end 22 of the vehicle 20 including first and second wheels 26, 28, and one axle assembly 32 for the back end 24 of the vehicle 20 including first and second wheels 26, 28).

With particular reference to FIGS. 1 and 4, the electric motor 40 is disposed in the axle cavity 38 such that the electric motor 40 is surrounded by the axle housing 34. Having the axle housing 34 defining the axle cavity 38 and including the electric motor 40 disposed in the axle cavity 38 such that the electric motor 40 is surrounded by the axle housing 34 shields the electric motor 40 from an external environment, which results in limiting if not eliminating the electric motor 40 from being exposed to debris from the external environment. Second, electric motors in vehicles typically utilize a cooling system to cool the electric motor during use. Having the electric motor 40 disposed in the axle cavity 38 reduces the complexity of the cooling system, if present, as the cooling system is able to be contained, for example, in the axle cavity 38. In other words, the cooling system may be integrated into the axle housing 34 and not be disposed in the first and/or second wheels 26, 28 of the vehicle 20. Additionally, any water lines that are used are not required to go through the chassis 30, which is required when the electric motor is disposed in one of the wheels of the vehicle. Third, inertia impact on the electric motor 40 as a result of vertical movement of the first and second wheels 26, 28 is reduced because the electric motor 40 is disposed in the axle cavity 38 rather than being disposed in the first or second wheel 26, 28. In other words, there is less vibrational load on the electric motor 40. Fourth, various electrical equipment, such as high-voltage cables, are shielded from the external environment and do not require complex electrical equipment to electrically couple the electric motor 40 to various control units of the vehicle 20. For example, the vehicle 20 may include a controller (not shown) configured to communicate with the electric motor 40 to determine the rotational power to be delivered to at least one of the first and second wheels 26, 28. Additionally, the axle assembly 32 through the electric motor 40 is able to provide precise torque management to the first and second wheels 26, 28, which enables increased tire life as a tire patch of the tire of the vehicle 20, improves range of the vehicle, and reduces energy needed to move the vehicle 20, as described in further detail below.

As illustrated in FIGS. 1 and 3, the electric motor 40 may be disposed inboard from the first and second wheels 26, 28. In other words, the electric motor 40 may disposed outside of the first and second wheels 26, 28 such that the electric motor 40 may be spaced from the first and second wheels 26, 28 with respect to the axle axis AA. Although not required, the electric motor 40 may be disposed closer to the pivot axis PA than to the first or second wheel 26, 28 such that the electric motor 40 is inboard of the first and second wheels 26, 28 in the axle cavity 38. Having the electric motor disposed inboard of the first and second wheels 26, 28 allows the vehicle 20 to have a more stable center of gravity (i.e., mass of the electric motor 40 is more central to the pivot axis PA with respect to the first and second wheels 26, 28). Additionally, having the electric motor 40 disposed closer to the pivot axis PA than to the first or second wheel 26, 28 reduces inertia impact on the electric motor 40, as the electric motor 40 does not move vertically in unison with the first wheel 26 or the second wheel 28. Having the electric motor 40 disposed inboard of the first and second wheels 26, 28 allows different braking systems to be included in the vehicle 20. For example, the braking system may be disposed in at least one of the first and second wheels 26, 28, because the electric motor 40 is not disposed in the first and second wheels 26, 28. The braking system may be a conventional disk brake or may be multi-plate brake.

With continued reference to FIGS. 1 and 3, the electric motor 40 may be further defined as a first electric motor 42 configured to be rotatably coupled to the first wheel 26, with the axle assembly further including a second electric motor 44 configured to be rotatably coupled to the second wheel 28. As a non-limiting example, the first and second electric motors 42, 44 may have a stator diameter of about 200 to 300 millimeters, about 225 to 275 millimeters, or about 250 millimeters, and the first and second electric motors 42, 44 may have a full load rating of about 50 to 100 KW. It is to be appreciated that in addition to the first and second electric motors 42, 44 delivering rotational power to at least one of the first and second wheels 26, 28, respectively, the first and second electric motors 42, 44 may also be configured as generators to provide electric power regeneration and, in turn, electric braking. When present, the second electric motor 44 is disposed in the axle cavity 38 such that the second electric motor 44 is surrounded by the axle housing 34. Typically, the second electric motor 44 is spaced from the first electric motor 42 along the axle axis AA, with the pivot axis PA disposed between the first and second electric motors 42, 44 along the axle axis AA. Having the first and second electric motors 40, 42 allows precise torque management to be provided to the first and second wheels 26, 28, which enables increased tire life, improves range of the vehicle 20, and reduces energy needed to move the vehicle 20. In particular, because precise rotational power may be provided to the first and second wheels 26, 28, the first and second wheels 26, 28 may rotate at different speeds, which optimizes tire life, and turning and range of the vehicle 20.

When the first and second electric motors 42, 44 are present, the first electric motor 42 may be disposed inboard from the first wheel 26 and the second electric motor 44 may be disposed inboard from the second wheel 28. In other words, the first electric motor 42 may be disposed outside of the first wheel 26 and the second electric motor 44 may be disposed outside of the second wheel 28 such that the first electric motor 42 is spaced from the first wheel 26 with respect to the axle axis AA and the second electric motor 44 is spaced from the second wheel 28 with respect to the axle axis AA. Said differently, a distance defined between the first and second electric motors 42, 44 with respect to the axle axis AA is less than a distance defined between the first and second wheels 26, 28. Although not required, the first electric motor 42 may be configured to be disposed closer to the pivot axle 56 than to the first wheel 26, and the second electric motor 44 may be disposed closer to the pivot axle 56 than to the second wheel 28 such that the electric motor 40 is inboard of the second wheel 28 in the axle cavity 38. Having the first and second electric motors 42, 44 disposed inboard of the first and second wheels 26, 28 allows the vehicle 20 reduces the yaw inertia of the vehicle 20, which improves the directional response of the vehicle 20. Additionally, having the first and second electric motors 42, 44 disposed closer to the pivot axis PA than to the first and second wheels 26, 28, respectively, reduces inertia impact on the electric motor 40, as the first electric motor 42 does not move vertically in unison with the first wheel 26 and the second electric motor 44 does not move vertically in unison with the second wheel 28. Having the first and second electric motors 42, 44 disposed inboard of the first and second wheels 26, 28 allows different braking systems to be included in the vehicle 20. For example, the braking system may be disposed in at least one of the first and second wheels 26, 28, because the first and second electric motors 42, 44 are not disposed in the first and second wheels 26, 28, respectively. The braking system may be a conventional disk brake or may be multi-plate brake.

With reference to FIG. 1, the axle assembly 32 may include an output shaft 46, commonly also referred to as an axle shaft, rotatably coupled to the first electric motor 42 and rotatable with respect to the axle housing 34, and with the output shaft 46 being configured to be rotatably coupled to one of the first and second wheels 26, 28. The output shaft 46 may be disposed in the axle cavity 38 such that the output shaft 46 is surrounded by the axle housing 34. In one embodiment, the output shaft 46 is further defined as a first output shaft 48 configured to be rotatably coupled to the first wheel 26, with the axle assembly 32 further including a first output shaft 50 rotatably coupled to the second electric motor 44 and rotatable with respect to the axle housing 34. In such embodiments, the first output shaft 50 is configured to be rotatably coupled to the second wheel 28. The first output shaft 50 may be disposed in the axle cavity 38 such that the first output shaft 50 is surrounded by the axle housing 34.

The axle assembly 32 may include power electronics 52 disposed in the axle cavity 38 such that the power electronics 52 are surrounded by the axle housing 34. Having the power electronics 52 disposed in the axle cavity 38 protects the power electronics 52 from the external environment. The power electronics 52 may include a power inverter. When present, the power inverter transforms DC current from a battery 53 of the vehicle 20 to AC current. The battery 53 is configured to deliver electrical power to the electric motor 40 and, when present, the first and second electric motors 42, 44. Having the power inverter allows the electric power to be efficiently transmitted to the electric motor 40, and in some embodiments the first and second electric motors 42, 44. The power electronics 52 may also include other electronic elements in addition to the power inverter, such as an electronic control unit (ECU). When present, the ECU may be configured to communicate with various controls of the vehicle 20 for allowing the axle assembly 32 to maximize stability and turning. In particular, the ECU is typically electrically coupled to the battery 53 for delivering electrical power to the electric motor 40 and, when present, the first and second electric motors 42, 44.

In one embodiment, as shown in FIG. 4, the axle assembly 32 may include a steering motor 54 coupled to the axle housing 34, with the steering motor 54 configured to pivot the axle housing 34 about the pivot axis PA for steering the vehicle 20 during operation. When the steering motor 54 is present, the steering motor 54 may be disposed in the axle cavity 38 such that the steering motor 54 is surrounded by the axle housing 34. In other embodiments, the steering motor 54 may be disposed outside of the axle cavity 38. For example, it is to be appreciated that the steering motor 54 may be coupled to the chassis 30 or any other suitable component of the vehicle 20.

To help with steering of the vehicle 20 by pivoting the axle housing 34 about the pivot axis PA, the steering motor 54 may provide torque vectoring to assist in steering the vehicle 20. In other words, the steering motor 54 controls the amount of rotational power provided to the first and second wheels 26, 28, which allows the axle assembly 32 to steer the vehicle 20 as the axle housing 34 pivots about the pivot axis PA. To control the amount of rotational power provided to the first and second wheels 26, 28, the axle assembly 32 may include a plurality of pinions 55 rotatably coupled to the steering motor 54 and the first and second output shafts 46, 48 for regulating the rotational power provided to the first and second wheels 26, 28. As the rotational power provided by the electric motor 40 varies to the first and second wheels 26, 28 as a result of the torque vectoring from the steering motor 54, the axle housing 34 is able to pivot about the pivot axis to facilitate steering of the vehicle 20. Having the steering motor 54 allows precise torque management to be provided to the first and second wheels 26, 28, which enables increased tire life, improves range of the vehicle 20, and reduces energy needed to move the vehicle 20. In particular, because precise rotational power may be provided to the first and second wheels 26, 28, the first and second wheels 26, 28 may rotate at different speeds, which optimizes tire life, and turning and range of the vehicle 20.

With continued reference to FIG. 4, when the steering motor 54 is present, the electric motor 40 is typically configured to be rotatably coupled to both the first and second wheels 26, 28. In other words, the electric motor 40 of the axle assembly 32 is a single electric motor configured to be rotatably coupled to both the first and second wheels 26, 28. In such embodiments, the electric motor 40 is able to provide sufficient rotational power to the first and second wheels 26, 28 to provide movement of the vehicle 20. In other words, the electric motor 40 is configured to deliver rotational power to both the first and second wheels 26, 28. Such embodiments, the electric motor 40 is commonly referred to as a traction motor. As a non-limiting example, the electric motor 40 in such embodiments may have a stator diameter of about 200 to 300 millimeters, about 225 to 275 millimeters, or about 250 millimeters, and the electric motor 40 may have a full load rating of about 50 to 100 KW. As mentioned above, to assist with steering the vehicle 20, the axle assembly 32 may include the steering motor 54. As a non-limiting example, the steering motor 54 may have a diameter of about 100 to 120 millimeters, and may have a full load rating of about 5 KW.

As shown in FIG. 2, the axle assembly 32 may include a pivot axle 56 coupled to the axle housing 34, with the pivot axle 56 extending along the pivot axis PA such that the axle housing 34 pivots about the pivot axle 56. In one embodiment, the pivot axle 56 extends from the axle housing along the pivot axis PA. When the pivot axle 56 extends from the axle housing 34 along the pivot axis PA, the pivot axle 56 may be rigidly coupled to the axle housing 34. For example, the pivot axle 56 may be fastened to the axle housing 34. As another example, the pivot axle 56 may be integral with the axle housing 34, i.e., one piece. To receive the pivot axle 56, the chassis 30 may define a chassis pivot cavity 58 for receiving the pivot axle 56. In such embodiments, the pivot axle 56 is disposed within the chassis pivot cavity 58 for allowing the pivot axle 56 to pivot within the chassis pivot cavity 58, and/or for allowing the pivot axle 56 to be rigidly coupled to the chassis 30 such that the axle housing 34 pivots about the pivot axle 56.

It is to be appreciated that when the axle assembly 32 is coupled to the chassis 30 and therefore resulting in the assembled pivoting assembly 36, the pivot axle 56 is coupled the axle housing 34 and the chassis 30. In one embodiment, the pivot axle 56 may extend from the chassis 30 along the pivot axis PA. When the pivot axle 56 extends from the chassis 30 along the pivot axis PA, the pivot axle 56 may be rigidly coupled to the chassis 30. For example, the pivot axle 56 may be fastened to the chassis 30. As another example, the pivot axle 56 may be integral with the chassis 30, i.e., one piece. To receive the pivot axle 56, the axle housing 34 may define an axle housing pivot cavity 60 for receiving the pivot axle 56. In such embodiments, the pivot axle 56 is disposed in the axle housing pivot cavity 60 for allowing the axle housing 34 to pivot about the pivot axle 56. Alternatively, the pivot axle 56 may be rigidly coupled to the axle housing 30 such that the pivot axle 56 pivots in the chassis pivot cavity 58 to pivot the axle housing 34 with respect to the chassis 30. It is also to be appreciated that the pivot axle 56 may be a standalone piece that is disposed in the chassis pivot cavity 58 and the axle housing pivot cavity 60, and that the pivot axle 56 may be rigidly coupled to one of the axle housing 34 or the chassis 30 such that the pivot axle 56 pivots with respect to the other of the axle housing 34 and the chassis 30.

Figure 5:
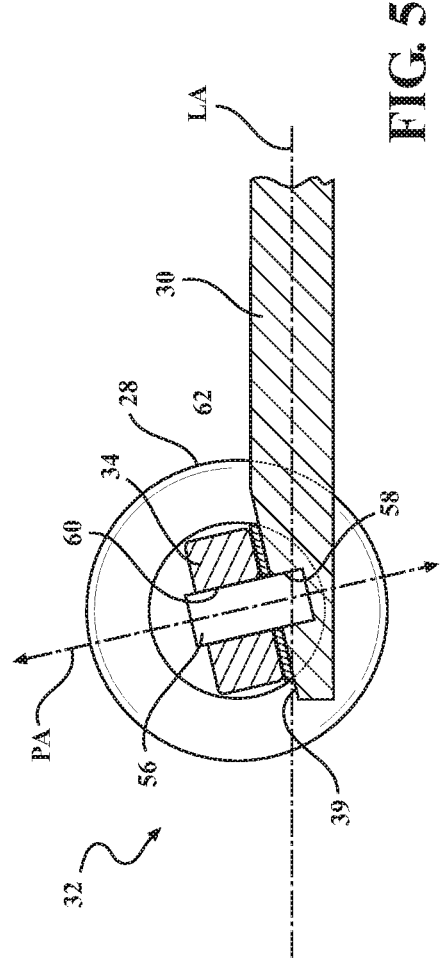
FIG. 5 is a schematic side view of the pivoting assembly of FIG. 2, further including a bushing disposed about the pivot axle and disposed between the chassis and the axle housing.

As shown in FIG. 5, to help facilitate pivoting of the axle housing 34 about the pivot axle 56, the axle assembly 32 may additionally include a bushing 62 disposed about the pivot axle 56 and configured to be disposed between the chassis 30 and the axle housing 34 with respect to the pivot axis PA for supporting the axle housing 34 during pivoting of the axle housing 34 about the pivot axle 56. The bushing 62 may be any suitable bushing, such as a rubber donut. The bushing 62 may also be an "active bushing," which is configured to change compliance, e.g., stiffness and/or distance defined, between the axle housing 34 and the chassis 30. When the chassis 30 has the angled surface 39, the bushing 62 may be disposed on the angled surface 39, with the axle housing 34 sandwiching the bushing 62 between the axle housing 34 and the angled surface 39.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. An axle assembly for use in a vehicle including a first wheel and a second wheel spaced from the first wheel, and a chassis extending along a chassis axis, said axle assembly comprising:
    an axle housing extending along an axle axis and configured to be coupled to the chassis, to extend between the first and second wheels, and to support the first and second wheels, wherein said axle housing defines an axle cavity such that the axle housing has a hollow configuration, wherein said axle housing is configured to pivot with respect to the chassis about a pivot axis perpendicular to said axle axis, and wherein said pivot axis is configured to be obliquely oriented with respect to the chassis axis such that said axle housing is configured to be a tilted axle housing; and
    an electric motor coupled to said axle housing and configured to be rotatably coupled to at least one of the first and second wheels;
    wherein said electric motor is disposed in said axle cavity such that said electric motor is surrounded by said axle housing.

2. The axle assembly as set forth in claim 1, wherein said electric motor is further defined as a first electric motor configured to be rotatably coupled to the first wheel, wherein said axle assembly further comprises a second electric motor configured to be rotatably coupled to the second wheel, and wherein said second electric motor is disposed in said axle cavity such that said second electric motor is surrounded by said axle housing.

3. The axle assembly as set forth in claim 2, wherein said second electric motor is spaced from said first electric motor along said axle axis, and wherein said pivot axis is disposed between said first and second electric motors along said axle axis.

4. The axle assembly as set forth in claim 2, further comprising an output shaft rotatably coupled to said first electric motor and rotatable with respect to said axle housing, and wherein said output shaft is configured to be rotatably coupled to one of the first and second wheels.

5. The axle assembly as set forth in claim 4, wherein said output shaft is disposed in said axle cavity such that said output shaft is surrounded by said axle housing.

6. The axle assembly as set forth in claim 4, wherein said output shaft is further defined as a first output shaft configured to be rotatably coupled to the first wheel, wherein said axle assembly further comprises a second output shaft rotatably coupled to said second electric motor and rotatable with respect to said axle housing, and wherein said second output shaft is configured to be rotatably coupled to the second wheel.

7. The axle assembly as set forth in claim 1, further comprising a power electronics disposed in said axle cavity such that said power electronics are surrounded by said axle housing.

8. The axle assembly as set forth in claim 1, further comprising a steering motor coupled to said axle housing, with said steering motor configured to pivot said axle housing about said pivot axis for steering the vehicle during operation.

9. The axle assembly as set forth in claim 8, wherein said electric motor is configured to be rotatably coupled to both the first and second wheels.

10. The axle assembly as set forth in claim 8, wherein said steering motor is disposed in said axle cavity such that said steering motor is surrounded by said axle housing.

11. The axle assembly as set forth in claim 1, further comprising a torque vectoring motor rotatably coupled to said electric motor, wherein said torque vectoring motor is configured to regulate rotational power provided to the first and second wheels from said electric motor.

12. The axle assembly as set forth in claim 1, wherein electric motor is disposed closer to said pivot axis than to the first or second wheel such that said electric motor is inboard of the first and second wheels in said axle cavity.

13. The axle assembly as set forth in claim 12, wherein said electric motor is further defined as a first electric motor configured to be rotatably coupled to the first wheel, wherein said axle assembly further comprises a second electric motor configured to be rotatably coupled to the second wheel, wherein said second electric motor is disposed in said axle cavity such that said second electric motor is surrounded by said axle housing, wherein said first electric motor is configured to be disposed closer to said pivot axle than to the first wheel, and wherein said second electric motor is disposed closer to said pivot axle than to the second wheel such that said electric motor is inboard of the second wheel in said axle cavity.

14. The axle assembly as set forth in claim 1, further comprising a pivot axle coupled to said axle housing, wherein said pivot axle extends along said pivot axis such that said axle housing pivots about said pivot axle.

15. The axle assembly as set forth in claim 14, wherein said pivot axle extends from said axle housing along said pivot axis.

16. The axle assembly as set forth in claim 14, further comprising a bushing disposed about said pivot axle and configured to be disposed between the chassis and said axle housing with respect to said pivot axis for supporting said axle housing during pivoting of said axle housing about said pivot axle.

17. A pivoting assembly for a vehicle including a first wheel and a second wheel spaced from the first wheel, said pivoting assembly comprising:
a chassis extending along a chassis axis; and
an axle assembly comprising,
an axle housing extending along an axle axis and coupled to said chassis, wherein said axle housing is configured to extend between the first and second wheels, and to support the first and second wheels, and wherein said axle housing defines an axle cavity such that the axle housing has a hollow configuration,
a pivot axle coupled to said axle housing and said chassis, wherein said pivot axle extends along a pivot axis perpendicular to said axle axis, wherein said axle housing is pivotable about said pivot axle for pivoting said axle housing with respect to said chassis, and wherein said pivot axis is obliquely oriented with respect to said chassis axis such that said axle housing is configured as a tilted axle housing, and
an electric motor coupled to said axle housing and configured to be rotatably coupled to at least one of the first and second wheels;
wherein said electric motor is disposed in said axle cavity such that said electric motor is surrounded by said axle and disposed in said axle cavity.

18. The pivoting assembly as set forth in claim 17, wherein said chassis has an angled surface obliquely oriented with respect to said chassis axis, and wherein said angled surface supports said axle housing.

19. The pivoting assembly as set forth in claim 17, wherein said pivot axle extends from said axle housing along said pivot axis.

20. The pivoting assembly as set forth in claim 17, wherein said pivot axle extends from said chassis along said pivot axis.

* * * * *

UNITED STATES PATENT AND TRADEMARK OFFICE
CERTIFICATE OF CORRECTION

PATENT NO. : 11,124,055 B2  
APPLICATION NO. : 16/814614  
DATED : September 21, 2021  
INVENTOR(S) : Maguire et al.

It is certified that error appears in the above-identified patent and that said Letters Patent is hereby corrected as shown below:

On the Title Page

Item (73), Assignee, please delete "Borg Warner" and replace with -- BorgWarner --

In the Claims

Claim 13, Column 9, Line 44, please delete "said pivot axle" and replace with -- said pivot axis --

Claim 13, Column 9, Line 46, please delete "said pivot axle" and replace with -- said pivot axis --

Signed and Sealed this  
Fourteenth Day of December, 2021

Drew Hirshfeld  
*Performing the Functions and Duties of the*  
*Under Secretary of Commerce for Intellectual Property and*  
*Director of the United States Patent and Trademark Office*